United States Patent
Chou et al.

(10) Patent No.: US 8,247,774 B2
(45) Date of Patent: Aug. 21, 2012

(54) OUTPUT RATIO ADJUSTING METHOD FOR OPTIC SENSOR

(75) Inventors: Wen-Long Chou, Miaulih (TW); Ni-Ting Chu, Miaulih (TW)

(73) Assignee: Tyntek Corporation, Hsinchu (TW)

( * ) Notice: Subject to any disclaimer, the term of this patent is extended or adjusted under 35 U.S.C. 154(b) by 573 days.

(21) Appl. No.: 12/453,081

(22) Filed: Apr. 29, 2009

(65) Prior Publication Data

US 2010/0276596 A1    Nov. 4, 2010

(51) Int. Cl.
*G01J 5/02* (2006.01)
(52) U.S. Cl. .................................... 250/340
(58) Field of Classification Search .............. 250/340
See application file for complete search history.

(56) References Cited

U.S. PATENT DOCUMENTS

| | | | | |
|---|---|---|---|---|
| 7,126,099 B2* | 10/2006 | Hsu et al. | ............ | 250/208.1 |
| 2005/0098713 A1* | 5/2005 | Holland | ............ | 250/221 |
| 2007/0158532 A1* | 7/2007 | Lin | ............ | 250/208.1 |
| 2009/0135304 A1* | 5/2009 | Inoue et al. | ............ | 348/712 |
| 2009/0243014 A1* | 10/2009 | Lim | ............ | 257/432 |

* cited by examiner

*Primary Examiner* — David Porta
*Assistant Examiner* — Djura Malevic
(74) *Attorney, Agent, or Firm* — Rosenberg, Klein & Lee (57) ABSTRACT

A method for adjusting output ratio of an optic sensor includes the following steps: measuring and obtaining a response spectrum of the optic sensor; analyzing optic response ratios of the response spectrum at different wavelengths; designing a ratio of light reception areas of the optic sensor, the design being carried out in accordance with three aspects of "the response spectrum" "a fixed proportional relationship being present between multiplication of the optic response ratio and the light reception area and an output of light current" and "a proportional relationship being present between the light reception area and the output of the light current"; and obtaining light current outputs of identical proportions (such as 1:1:1) or in a desired ratio (meaning any arbitrary ratio other than 1:1:1, such as 1:2:1, 1:2:3, or 3:4:5) in accordance with the design of the previous step.

12 Claims, 9 Drawing Sheets

| wavelength (nm) | optic response ratio (%) | light reception area ratio (%) | output of light current (μA) |
|---|---|---|---|
| 400 | 6% | 29.83% | 0.017900171 |
| 450 | 11% | 16.06% | 0.017900171 |
| 500 | 18% | 10.14% | 0.017900171 |
| 550 | 26% | 6.88% | 0.017900171 |
| 600 | 36% | 4.92% | 0.017900171 |
| 650 | 49% | 3.66% | 0.017900171 |
| 700 | 61% | 2.92% | 0.017900171 |
| 750 | 72% | 2.50% | 0.017900171 |
| 800 | 81% | 2.21% | 0.017900171 |
| 850 | 89% | 2.02% | 0.017900171 |
| 900 | 95% | 1.88% | 0.017900171 |
| 950 | 98% | 1.81% | 0.017900171 |
| 1000 | 99% | 1.83% | 0.017900171 |

| wavelength (nm) | optic response ratio (%) | light reception area ratio (%) | output of light current (μA) |
|---|---|---|---|
| 350 | 30% | 11.85% | 0.035669867 |
| 400 | 36% | 9.82% | 0.035669867 |
| 450 | 44% | 8.13% | 0.035669867 |
| 500 | 50% | 7.07% | 0.035669867 |
| 550 | 56% | 6.33% | 0.035669867 |
| 600 | 62% | 5.78% | 0.035669867 |
| 650 | 67% | 5.29% | 0.035669867 |
| 700 | 73% | 4.90% | 0.035669867 |
| 750 | 78% | 4.56% | 0.035669867 |
| 800 | 83% | 4.27% | 0.035669867 |
| 850 | 89% | 4.02% | 0.035669867 |
| 900 | 94% | 3.79% | 0.035669867 |
| 950 | 99% | 3.61% | 0.035669867 |
| 1000 | 97% | 3.66% | 0.035669867 |
| 1050 | 69% | 5.15% | 0.035669867 |
| 1100 | 30% | 11.78% | 0.035669867 |

Fig. 9

OUTPUT RATIO ADJUSTING METHOD FOR OPTIC SENSOR

FIELD OF THE INVENTION

The present invention relates to a method for adjusting output ratio of an optic sensor, and in particular to a method for adjusting light current output ratio to identical proportions (1:1:1) or a desired ratio (any ratio other than 1:1:1) in accordance with response spectrum, optic response ratio, and light reception area ratio.

BACKGROUND OF THE INVENTION

The design of a conventional optic sensor is quite simple, where area ratio for the three primary colors, red (R), green (G), and blue (B), is set to 1:1:1. (For example, three elements respectively for R, G, and B all occupy an angular range of 120 degrees of a circle, thereby having identical area.) Under the condition that the area ratio is 1:1:1, for a conventional device that the present inventor acquired, the ratio of light current is 18:23:16.

The conventional way of design is simple, but due to the fact that light current ratio becomes 18:23:16, the conventional devices suffer the drawbacks that the design and use of a power amplification circuit are made complicated and that, even worse, more integrated circuit chips are required in order to meet the specified requirements, leading to increased costs.

Thus, it is desired to provide an output ratio adjusting method to overcome the above discussed problems.

SUMMARY OF THE INVENTION

An objective of the present invention is to provide a novel method for adjusting output ratio of an optic sensor, which provide outputs of light current of identical proportions or any desired ratio in accordance with response spectrum, optic response ratio, and light reception area ratio, so as to provide the efficacy of simplifying the design and use of a power amplification circuit and making it possible to use only one integrated circuit chip for cost saving.

To realize the above objective, the present invention provides a method for adjusting output ratio of an optic sensor includes the following steps: measuring and obtaining a response spectrum of the optic sensor; analyzing optic response ratios of the response spectrum at different wavelengths; designing a ratio of light reception areas of the optic sensor, the design being carried out in accordance with three aspects of "the response spectrum" "a fixed proportional relationship being present between multiplication of the optic response ratio and the light reception area and an output of light current" and "a proportional relationship being present between the light reception area and the output of the light current"; and obtaining light current outputs of identical proportions (or in a desired ratio) in accordance with the design of the previous step.

BRIEF DESCRIPTION OF THE DRAWINGS

The present invention will be apparent to those skilled in the art by reading the following description of the best modes for carrying out the present invention, with reference to the drawings, in which.

DETAILED DESCRIPTION OF THE BEST MODES FOR CARRYING OUT THE INVENTION

Figure 1:
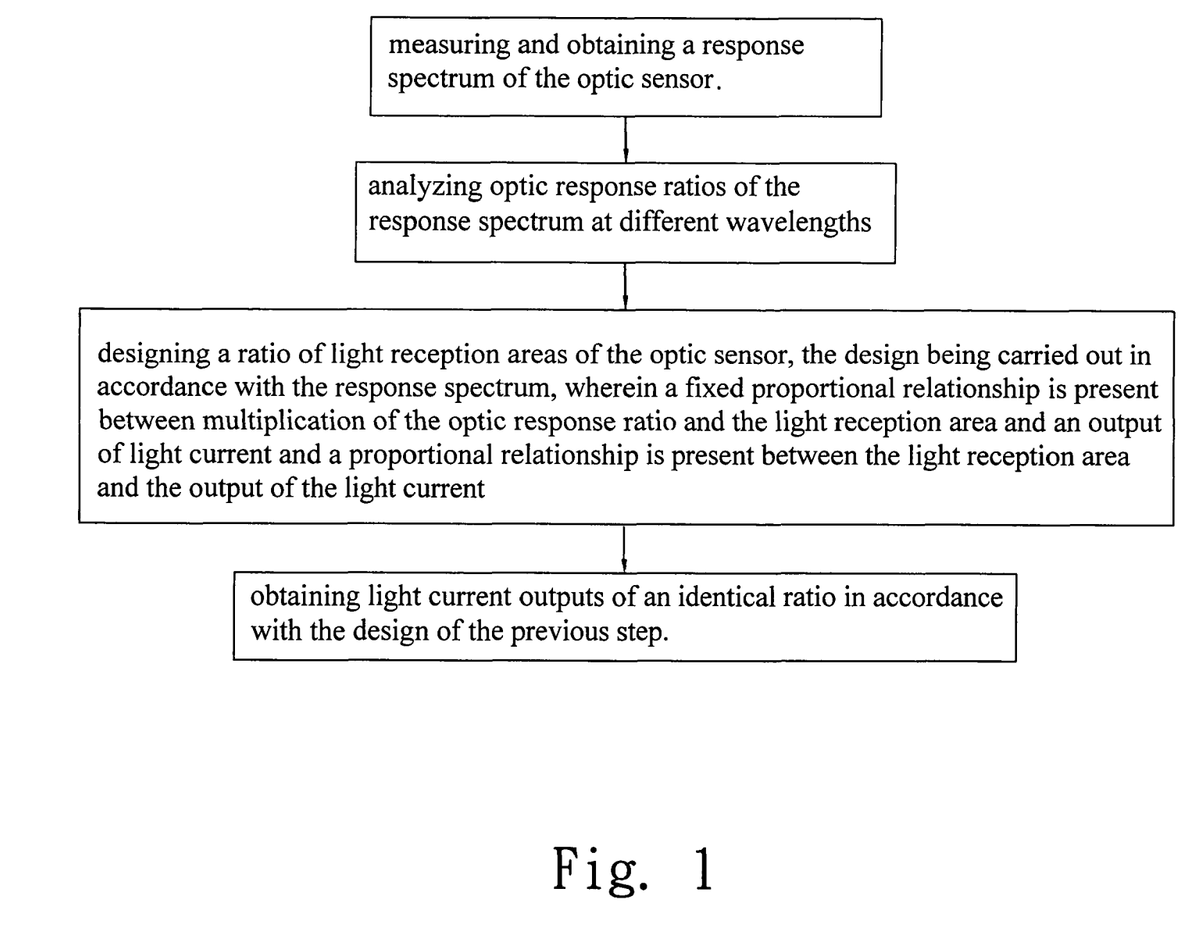
FIG. 1 is a flow chart for carrying out a second embodiment of the present invention.

The present invention provides an output ratio adjusting method for an optic sensor, of which three embodiments, respectively referred to as first, second, and third embodiments, will be described. The first embodiment relates to a sensor for detecting the three primary colors, namely red (R), green (G), and blue (B), for which no drawing is given. On the other hand, in the drawings, FIG. 1, as well as FIGS. 2-5, is given for illustrating the second embodiment, and FIGS. 6-9 are for the illustration of the third embodiment. The second and third embodiments are provided for employing specific adjusting strategies to ensure light current outputs of the same proportions and are particularly applicable to sensors that are designed for detecting different wavelengths. It is apparent that such specific adjusting strategies or processes can be modified to provide various proportions as desired, which are the light current outputs of desired ratios (realized through the second and third embodiments of the present invention).

The output ratio adjusting method provided in accordance with the first embodiment for an optic sensor will be described first. The optic sensor used here is a sensor for detecting R, G, and B primary colors. The adjusting method comprises the following steps:

(1) Setting the ratio among areas of R, G, B colors to 1:1:1, wherein the optic sensor can be a silicon (Si) made light detective diode (light detective diode of first material);

(2) Obtaining an original ratio among light currents for R, G, B, which is set to X:Y:Z, for the area ratio of R, G, B being 1:1:1;

(3) Obtaining a new ratio among light currents for R, G, B that is 1:1:1; and (4) Calculating a new ratio among areas of R, G, B, which is 1:X/Y:X/Z, for the new R, G, B light current ratio of 1:1:1.

For an example where the original R, G, B light current ratio is 16:23:18 under the condition that the R, G, B area ratio is 1:1:1, when the new R, G, B light current ratio is set to 1:1:1, the new R, G, B area ratio becomes 1:16/23:16/18 and further computation gives that the new R, G, B area ratio is 0.3869:0.2691:0.3439 (for the condition that the new R, G, B light current ratio is 1:1:1). In other words, if the R, G, B area ratio of an optic sensor is designed to be 0.3869:0.2691:0.3439, then the R, G, B light current ratio of the optic sensor will be 1:1:1.

Figure 2:
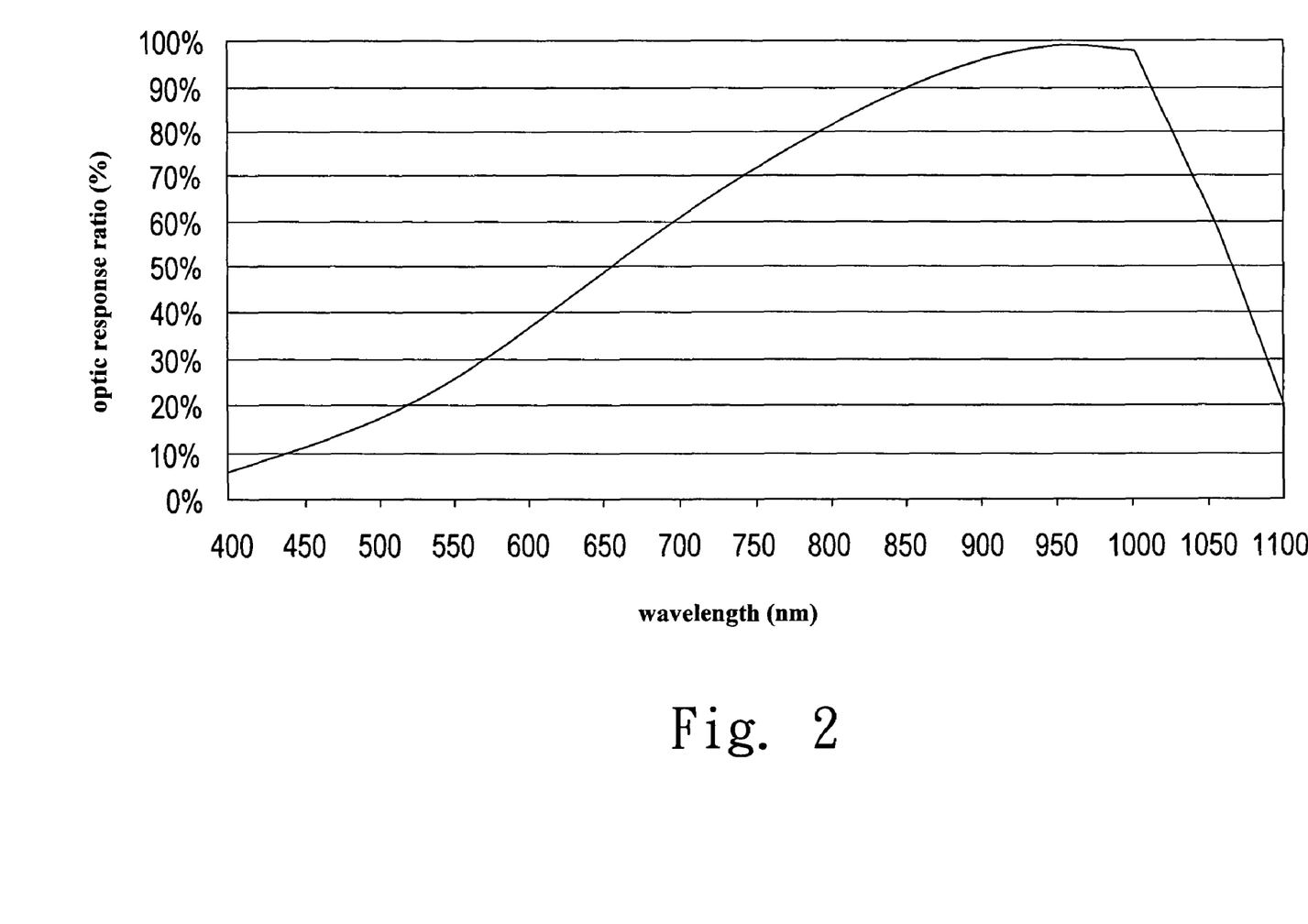
FIG. 2 is a response spectrum for a light detective diode in accordance with the second embodiment of the present invention.
Figure 3:
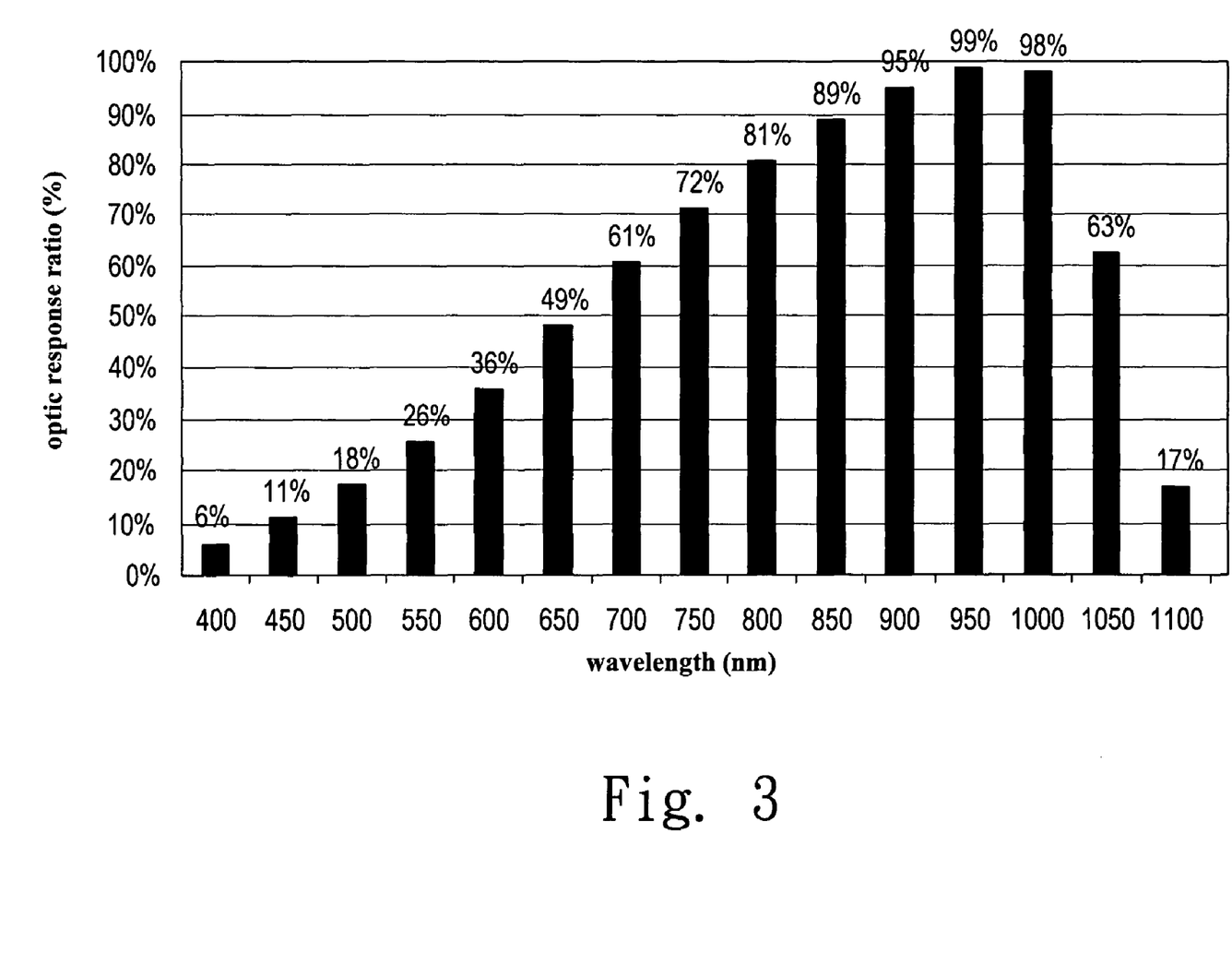
FIG. 3 illustrates optic response ratio at different wavelengths in accordance with the second embodiment of the present invention.
Figure 4:
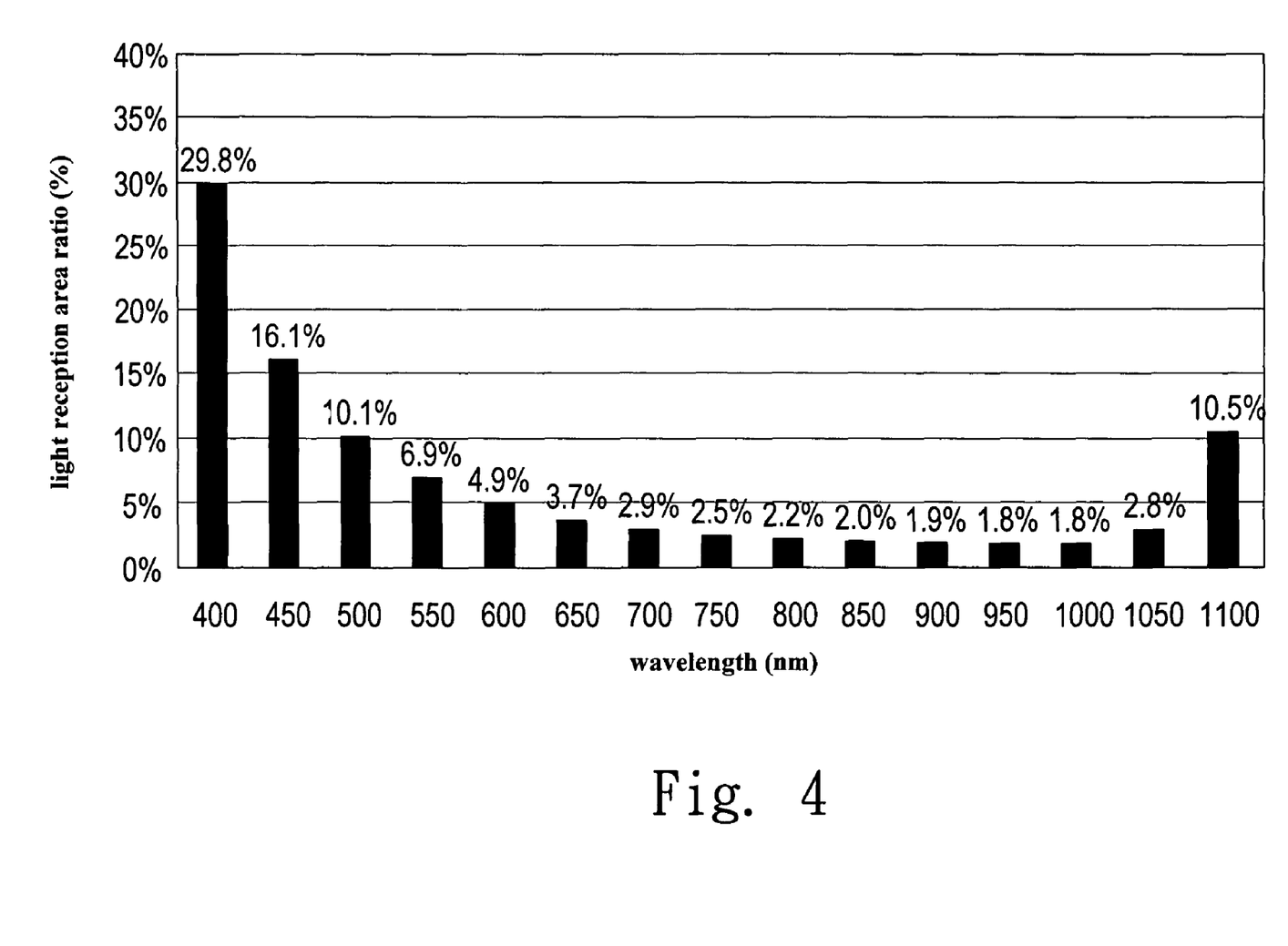
FIG. 4 illustrates light reception area ratios designed in accordance with the response spectrum of the second embodiment of the present invention.
Figure 5:
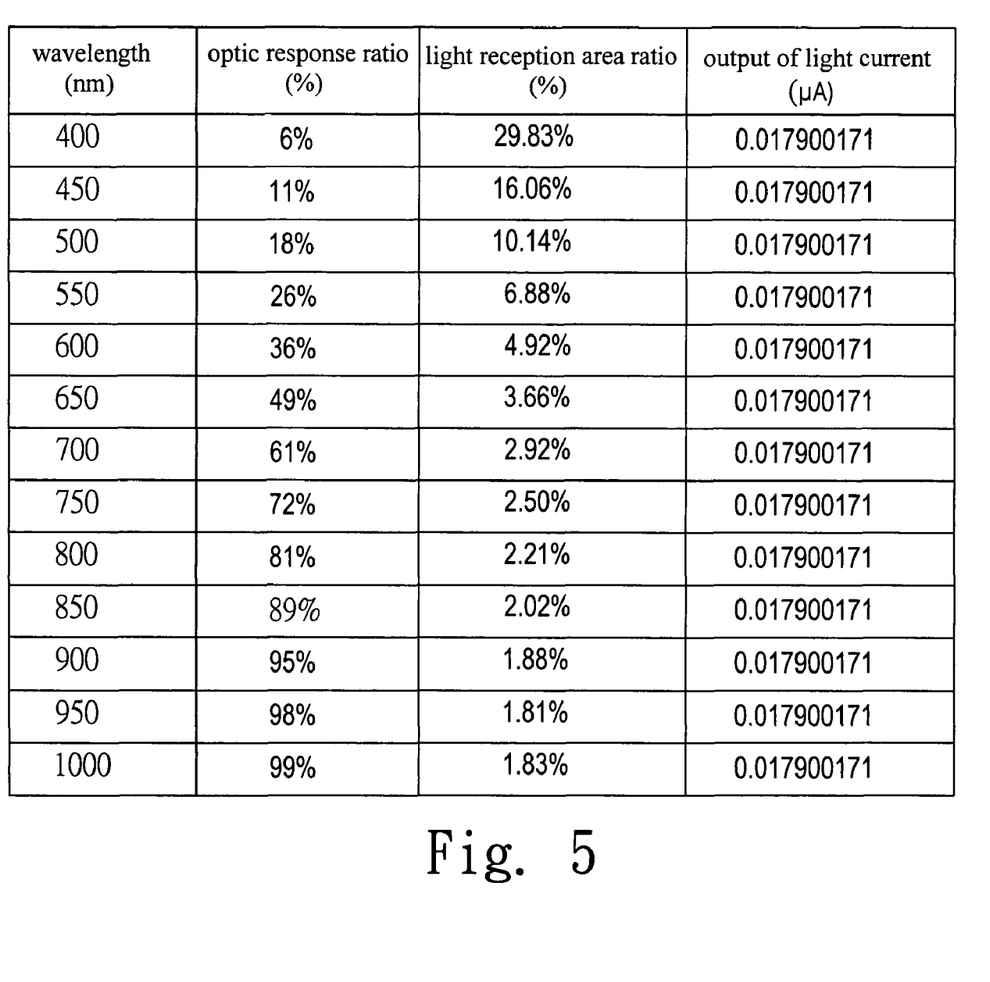
FIG. 5 illustrates identical ratio of light current output obtained in accordance with the second embodiment of the present invention.

Referring to FIGS. 1-5, an output ratio adjusting method in accordance with the second embodiment of the present invention for an optic sensor will be described. The optic sensor is a sensor for detecting various wavelengths. The adjusting method comprises the following steps:

(1) Measuring and obtaining a response spectrum (as shown in FIG. 2) for the optic sensor, wherein the optic sensor can be a silicon (Si) made light detective diode (light detective diode of first material), and wherein the axis of abscissa indicates wavelength;

(2) Analyzing optic response ratios of the response spectrum at different wavelengths (see FIG. 3), wherein in the example illustrated, the optic response ratios obtained through the analysis are as follows: the optic response ratio being 6% for wavelength of 400 nm (nanometers); the optic response ratio being 11% for wavelength of 450 nm; . . . ; the optic response ratio being 99% for wavelength of 950 nm; the optic response ratio being 98% for wavelength of 1000 nm; the optic response ratio being 63% for wavelength of 1050 nm; and the optic response ratio being 17% for wavelength of 1100 nm; in other words, the optic response ratio is getting higher for the range of wavelength from 400 nm to 950 nm and the optic response ratio gets down quickly for wavelength greater than 950 nm until reaching 1100 nm;

(3) Designing the ratio among light reception areas of the optic sensor with the following three aspects, wherein the first aspect is to carry out a design in accordance with the response spectrum illustrated in FIG. 2, the second aspect is to carry out a design on the basis that a fixed proportional relationship is present between the multiplication of the optic response ratio and light reception area and the output of light current, and the third aspect is to carry out a design in accordance with a proportional relationship between the light reception area and the output of the light current, based on which three aspects of design, a desired ratio of the light reception areas can be properly designed (as illustrated in FIG. 4) and wherein in the example illustrated, the design gives a light reception area ratio of 29.8% for wavelength of 400 nm, a light reception area ratio of 16.1% for wavelength of 450 nm, a light reception area ratio of 10.1% for wavelength of 500 nm, . . . , a light reception area ratio of 1.8% for wavelength of 1000 nm, a light reception area ratio of 2.8% for wavelength of 1050 nm, and a light reception area ratio of 10.5% for wavelength of 1100 nm; in other words, the light reception area ratio shows a plot (FIG. 4) that is reverse to a plot of optic response ratio (FIG. 3); and (4) Obtaining light current outputs of the same ratio (as shown in FIG. 5) in accordance with the design processes of Step (3), such as the R, G, B light current output ratio being 1:1:1, wherein since the values of wavelength, optic response ratio, and light reception area ratio are all known, calculation can be made in accordance with the formula that a fixed proportional relationship is present between the multiplication of the optic response ratio and light reception area and the output of light current in order to obtain the same light current outputs, for example the light current output being approximately 0.0179 μA for the conditions that wavelength is 400 nm, optic response ratio is 6%, and light reception area ratio is 29.83%; and the light current output being approximately 0.0179 μA for the conditions that wavelength is 1100 nm, optic response ratio is 17%, and light reception area ratio is 10.50%. It is to be noted that the formula "a fixed proportional relationship being present between the multiplication of the optic response ratio and light reception area and the output of light current" applied above is a basic expression and a complete and workable formula can be provided by adding other variables that can be constants. This will not be further discussed.

Figure 6:
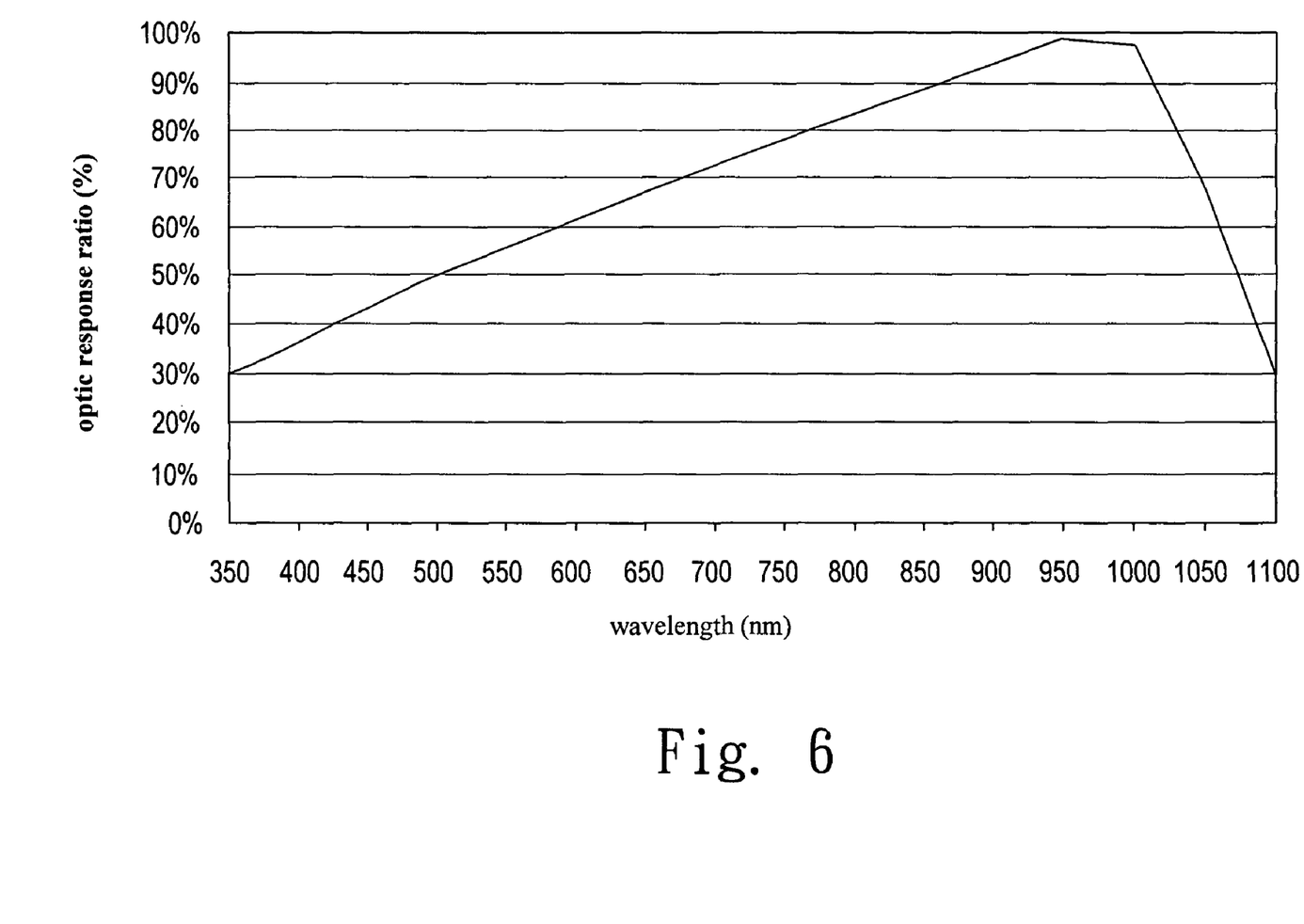
FIG. 6 is a response spectrum for a light detective diode in accordance with a third embodiment of the present invention.
Figure 7:
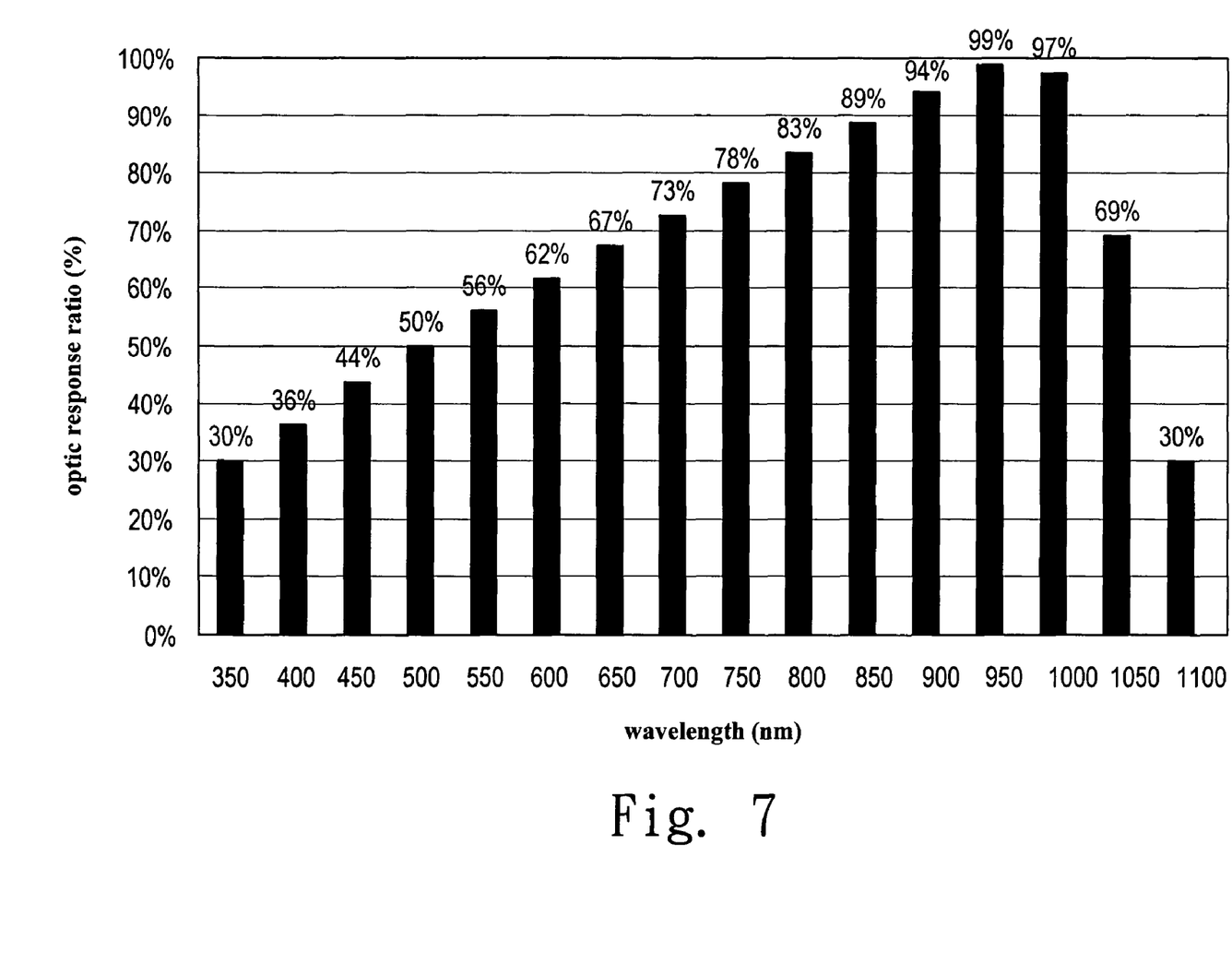
FIG. 7 illustrates optic response ratio at different wavelengths in accordance with the third embodiment of the present invention.
Figure 8:
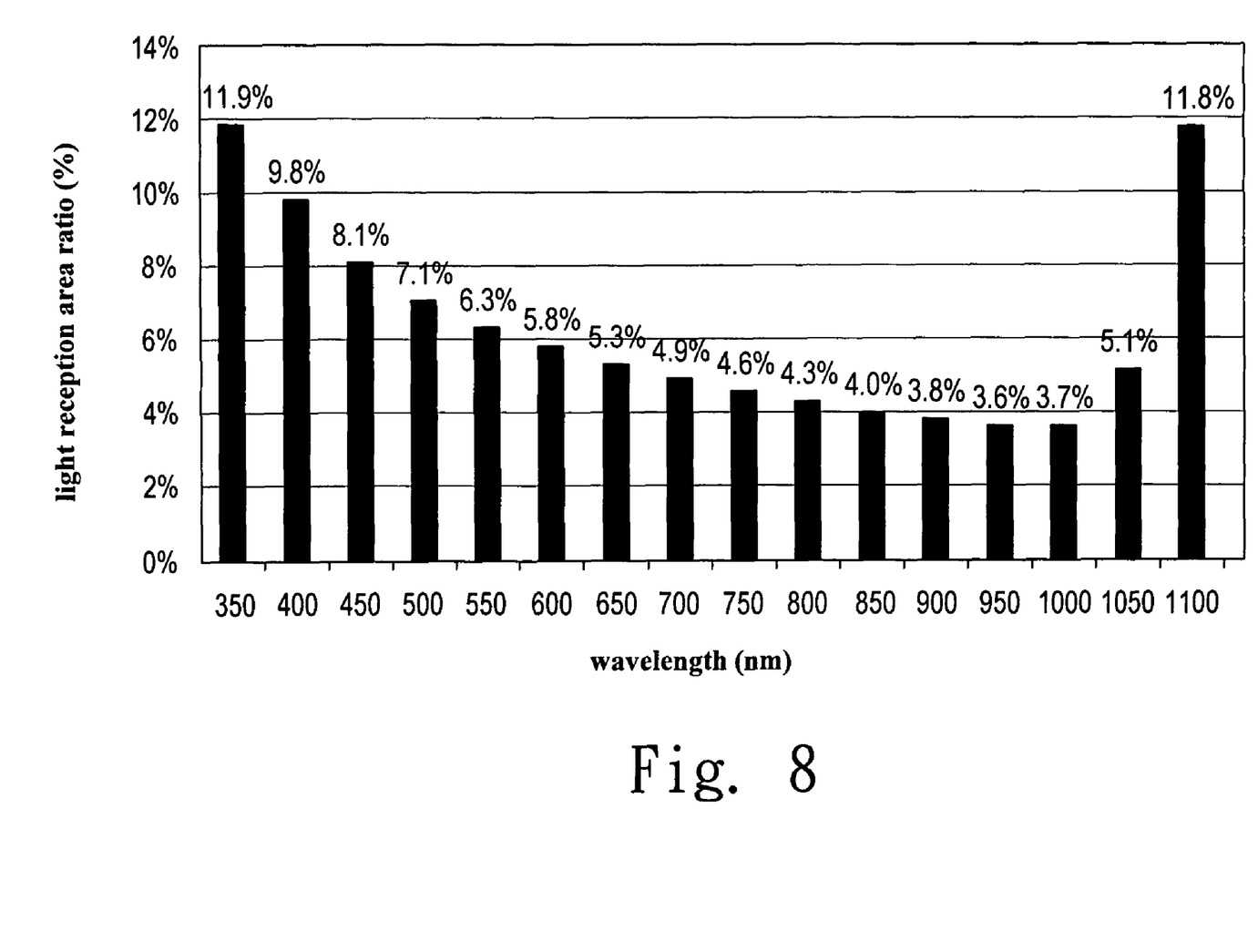
FIG. 8 illustrates light reception area ratios designed in accordance with the response spectrum of the third embodiment of the present invention.
Figure 9:
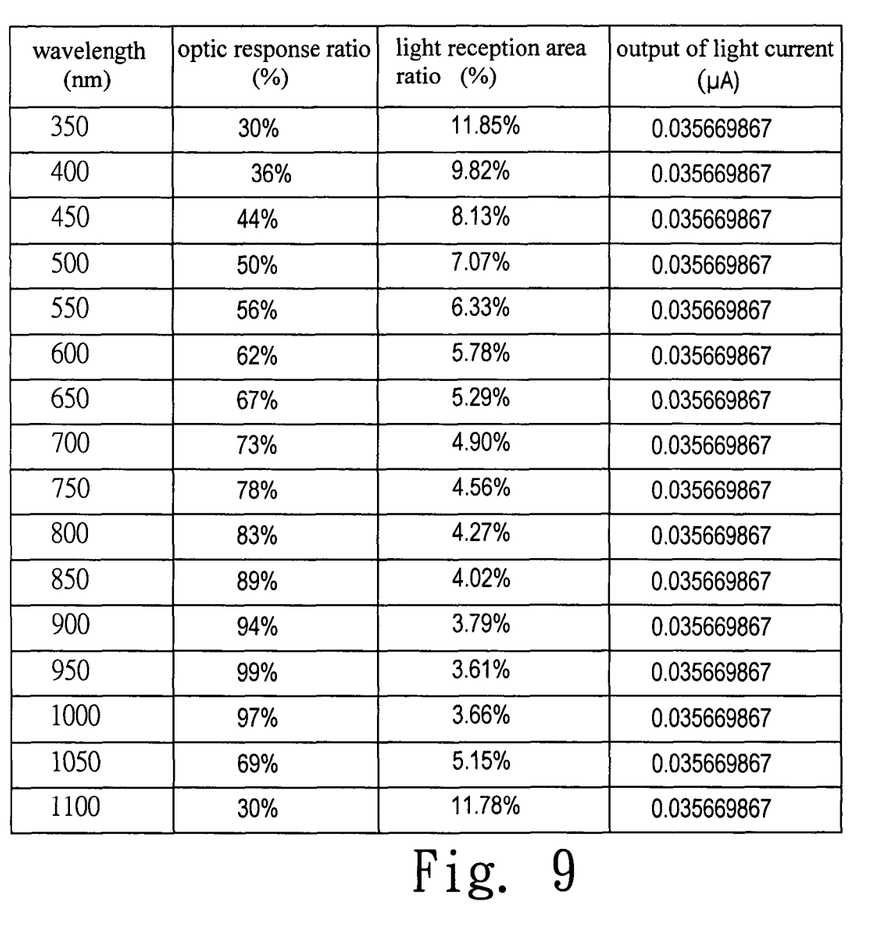
FIG. 9 illustrates identical ratio of light current output obtained in accordance with the third embodiment of the present invention.

Referring to FIGS. 6-9, an output ratio adjusting method in accordance with the third embodiment of the present invention for an optic sensor will be described. The optic sensor is a sensor for detecting various wavelengths. The adjusting method comprises the following steps:

(1) Measuring and obtaining a response spectrum (as shown in FIG. 6, wherein the axis of abscissa indicates wavelength) for the optic sensor, wherein the optic sensor is a light detective sensor made of GaP, GaAsP, GaAs, InP, InGaAs, AlGaInP, or InGaN (light detective diode of second material), the light detective diode of the second material (or even including the light detective diode of the first material) belonging to ultraviolet (UV) enhance type, infrared (IR) enhance type, blue enhance type, or UV+blue enhance type;

(2) Analyzing optic response ratios of the response spectrum at different wavelengths (as illustrated in FIG. 7), wherein in the example illustrated, the optic response ratios obtained through the analysis are as follows: the optic response ratio being 30% for wavelength of 350 nm; . . . ; the optic response ratio being 99% for wavelength of 950 nm; the optic response ratio being 97% for wavelength of 1000 nm; the optic response ratio being 69% for wavelength of 1050 nm; and the optic response ratio being 30% for wavelength of 1100 nm; in other words, the optic response ratio is getting higher for the range of wavelength from 350 nm to 950 nm and the optic response ratio gets down quickly for wavelength greater than 950 nm until reaching 1100 nm;

(3) Designing the ratio among light reception areas of the optic sensor with the following three aspects, wherein the first aspect is to carry out a design in accordance with the response spectrum illustrated in FIG. 6, the second aspect is to carry out a design on the basis that a fixed proportional relationship is present between the multiplication of the optic response ratio and light reception area and the output of light current, and the third aspect is to carry out a design in accordance with a proportional relationship between the light reception area and the output of the light current, based on which three aspects of design, a desired ratio of the light reception areas can be properly designed (as illustrated in FIG. 8) and wherein in the example illustrated, the design gives a light reception area ratio of 11.9% for wavelength of 350 nm, . . . , a light reception area ratio of 3.7% for wavelength of 1000 nm, a light reception area ratio of 5.1% for wavelength of 1050 nm, and a light reception area ratio of 11.8% for wavelength of 1100 nm; in other words, the light reception area ratio shows a plot (FIG. 8) that is reverse to a plot of optic response ratio (FIG. 7); and (4) Obtaining light current outputs of the same ratio (as shown in FIG. 9), wherein since the values of wavelength, optic response ratio, and light reception area ratio are all known, calculation can be made in accordance with the formula that a fixed proportional relationship is present between the multiplication of the optic response ratio and light reception area and the output of light current in order to obtain the same light current outputs, for example the light current output being approximately 0.0356 μA for the conditions that wavelength is 350 nm, optic response ratio is 30%, and light reception area ratio is 11.85%; and the light current output being approximately 0.0356 μA for the conditions that wavelength is 1100 nm, optic response ratio is 30%, and light reception area ratio is 11.78%. It is to be noted that the formula "a fixed proportional relationship being present between the multiplication of the optic response ratio and light reception area and the output of light current" applied above is a basic expression and a complete and workable formula can be provided by adding other variables that can be constants. This will not be further discussed.

As such, the second and third embodiments of the present invention provide easy designs for obtaining light current ratio 1:1:1 and consequently provide a design of power amplification circuit and/or ease of operation. It can even realized that all the design can be done is a single integrated circuit chip to reduce the costs.

It is apparent that the present invention allows providing a desired light current ratio (that is realized through the second and third embodiments of the present invention) according to stipulated requirements. In other words, beside the ratio of 1:1:1, any arbitrary ratio can be obtained. For an example where the light current output ratio is A:B:C, the values of A, B, and C can be partly identical and partly different (such as 1:2:1) or totally different (such as 1:2:3 or 3:4:5 and the likes).

Although the present invention has been described with reference to the best modes for carrying out the present invention, it is apparent to those skilled in the art that a variety of modifications and changes may be made without departing from the scope of the present invention which is intended to be defined by the appended claims.

What is claimed is:

1. A method for adjusting output ratio of an optic sensor, comprising the following steps:
   (1) measuring and obtaining a response spectrum of the optic sensor, the optic sensor defining an overall light reception area;
   (2) analyzing optic response ratios of the response spectrum at different wavelengths;
   (3) adjustably setting for each of the different wavelengths of the response spectrum a ratio of light reception area relative to the overall light reception area of the optic sensor to a value different from the optic response ratio corresponding thereto, in accordance with the response spectrum, wherein a fixed proportional relationship is maintained between the optic response ratio and the ratio of light reception area for each of the different wavelengths in the response spectrum; and
   (4) obtaining identical light current outputs for the different wavelengths in accordance with the adjustable setting of the previous step.

2. The method as claimed in claim 1, wherein in the step of obtaining light current outputs of identical ratio, the ratio of light current outputs for red, green, and blue is 1:1:1.

3. The method as claimed in claim 1, wherein the optic sensor comprises a silicon made light detective diode.

4. The method as claimed in claim 3, wherein the optic sensor comprises a light detective diode selected a type from the group consisting of ultraviolet (UV) enhance type, infrared (IR) enhance type, blue enhance type, and UV+blue enhance type.

5. The method as claimed in claim 1, wherein the optic sensor comprises a light detective diode made of a material selected from a group consisting of GaP, GaAsP, GaAs, InP, InGaAs, AlGaInP, and InGaN.

6. The method as claimed in claim 5, wherein the optic sensor comprises a light detective diode selected a type from the group consisting of ultraviolet (UV) enhance type, infrared (IR) enhance type, blue enhance type, and UV+blue enhance type.

7. A method for adjusting output ratio of an optic sensor, comprising the following steps:
   (1) measuring and obtaining a response spectrum of the optic sensor, the optic sensor defining an overall light reception area;
   (2) analyzing optic response ratios of the response spectrum at different wavelengths;
   (3) adjustably setting for each of the different wavelengths of the response spectrum a ratio of light reception area relative to the overall light reception area of the optic sensor to a value different from the optic response ratio corresponding thereto, in accordance with the response spectrum, wherein a fixed proportional relationship is maintained between the optic response ratio and the ratio of light reception area for each of the different wavelengths in the response spectrum; and
   (4) obtaining desired light current outputs for the different wavelengths in accordance with the adjustable setting of the previous step.

8. The method as claimed in claim 7, wherein in the step of obtaining light current outputs of a desired ratio, the ratio of light current outputs for red, green, and blue is A:B:C, which is an arbitrary ratio other than 1:1:1.

9. The method as claimed in claim 7, wherein the optic sensor comprises a silicon made light detective diode.

10. The method as claimed in claim 9, wherein the optic sensor comprises a light detective diode selected a type from the group consisting of ultraviolet (UV) enhance type, infrared (IR) enhance type, blue enhance type, and UV+blue enhance type.

11. The method as claimed in claim 7, wherein the optic sensor comprises a light detective diode made of a material selected from a group consisting of GaP, GaAsP, GaAs, InP, InGaAs, AlGaInP, and InGaN.

12. The method as claimed in claim 11, wherein the optic sensor comprises a light detective diode selected a type from the group consisting of ultraviolet (UV) enhance type, infrared (IR) enhance type, blue enhance type, and UV+blue enhance type.

* * * * *